United States Patent [19]

Beyer

[11] Patent Number: 4,770,059
[45] Date of Patent: Sep. 13, 1988

[54] MECHANICAL ROTARY DRIVE

[76] Inventor: Hasso Beyer, Mittelwalderstr. 28, 8900 Augsburg, Fed. Rep. of Germany

[21] Appl. No.: 798,890
[22] PCT Filed: Feb. 21, 1985
[86] PCT No.: PCT/DE85/00050
  § 371 Date: Dec. 18, 1985
  § 102(e) Date: Dec. 18, 1985
[87] PCT Pub. No.: WO85/03753
  PCT Pub. Date: Aug. 29, 1985

[30] Foreign Application Priority Data

Feb. 21, 1984 [DE] Fed. Rep. of Germany ....... 3406262

[51] Int. Cl.$^4$ ............................................. F16H 35/00
[52] U.S. Cl. ........................................ 74/640; 74/785
[58] Field of Search ................ 74/640, 805, 409, 785; 901/25

[56] References Cited

U.S. PATENT DOCUMENTS

| 3,214,999 | 11/1965 | Lapp | 74/640 |
| 3,482,770 | 12/1969 | Nelson | 74/640 |
| 3,555,929 | 1/1971 | Hossfeld | 74/640 |
| 4,096,766 | 6/1978 | Pardo et al. | 74/640 |
| 4,431,366 | 2/1984 | Inaba et al. | 74/640 X |
| 4,518,308 | 5/1985 | Grzybowski et al. | 74/640 X |
| 4,552,504 | 11/1985 | Nakada et al. | 74/640 X |

FOREIGN PATENT DOCUMENTS

| 0041136 | 5/1981 | European Pat. Off. |
| 0121063 | 2/1984 | European Pat. Off. |
| 3115061 | 2/1982 | Fed. Rep. of Germany |

OTHER PUBLICATIONS

Gear Handbook, First Edition, 1962, pp. 3-35-3-44, McGraw Hill.
Patent Abstract of Japan, vol. 6, No. 207, 10/19/82, p. M165, (1085 Fujitsu, Jul. 15, 1982).
Derwent Publications Limited Sections Mechanical Woche C48 Zusammenfassung Nr. L5313, Q64, Jan. 14, 1981 and Su, A. 727919 Metal Cons. DesBur, Apr. 18, 1980.

Primary Examiner—Leslie A. Braun
Assistant Examiner—David Novais
Attorney, Agent, or Firm—Hill, Van Santen, Steadman & Simpson

[57] ABSTRACT

Mechanical rotary drive, preferably a gear reduction drive, particularly for industrial robots, for example a manipulator arm rotary drive, comprising a driving side and a power take-off side, a drive shaft, and at least two gears, preferably reduction gears, situated on the drive shaft and biased against one another, the gear biasing at the driving side being executed via a torsionally stiff coupling and the gear biasing at the power take-off side being executed via a torsionally elastic coupling.

1 Claim, 2 Drawing Sheets

MECHANICAL ROTARY DRIVE

BACKGROUND OF THE INVENTION

1. Field of the invention

The invention relates to a mechanical rotary drive, preferably to a gear reduction drive, particularly for industrial robots, for example a manipulator arm rotary drive, comprising a driving side and a power take-off side, a drive shaft and at least two gears, preferably reduction gears, situated on the drive shaft and braced against one another.

2. Description of the prior art

Given industrial robots, manipulators and the like, there is a striving to be able to reach working points in as large as possible a spatial region proceeding from the location of the industrial robot or, respectively, of the manipulator. Particularly given multi-axis, for example 6-axis manipulators, it is also required that operations be carried out at workpieces which comprise an undercut shape with reference to the location of the manipulator, whereby a high, reduplicatable positioning precision is required at the same time. A significant problem in achieving the reduplicatable positioning precision required is the play existing in the rotary drives of the manipulator axes, this adding up with the plurality of axes and being carried over via the reach of the manipulator arms.

In a known rotary drive of the species initially cited (cf. German OS No. 31 15 061), the gears, in order to achieve an optimally play-free reduction of speed, are torsionally elastically connected at the driving side via the drive shaft and, at the power take-off side, are directly connected to the manipulator arm which can be placed in rotational motion via the gearing, this manipulator arm being executed torsionally stiff so that a torsionally stiff coupling of the reduction gearing derives overall at the power take-off side. The torsionally elastic coupling of the gears at the driving side of the rotary drive involves the disadvantage that, particularly given single-sided drive of the rotary drive, irregularities of motion occur dependent on the rotational sense which lead to undesirably great fluctuations with respect to the positioning precision. Although this disadvantage can be countered in that the initiation of torque is centrally provided on the drive shaft, this leads to solutions that are relatively involved structurally, particularly in an industrial robot, and is also disadvantageous with respect to service-friendliness. In order to nonetheless provide a single-sided drive of the drive shaft, the drive shaft must therefore be fashioned in a special way in order to establish an effective torsion angle with respect to the reduction gears which is respectively the same in both rotational senses.

Summary of the invention

Proceeding from the documented Prior Art, it is therefore the object of the present invention to specify a mechanical rotary drive, particularly for an industrial robot, with which a high positioning precision is attainable but which is also constructed in an optimally simple way and can also be manufactured in an optimally cost-favorable fashion.

The object stated above is first and essentially achieved in accord with the invention in that the gear biasing at the driving side is executed via a torsionally stiff coupling and is executed at the power take-off side via a torsionally elastic coupling.

The inventive measure of executing the gear biasing at the power take-off side torsionally elastic leads to the surprising advantage that very simple structural measures here lead to the desired result. A symmetrical output of the torque initiated at the driving side is no longer problematical at the power take-off side since the torque division is undertaken at the driving side and the same torque depends on the power take-off side at both reduction gears given practically identical torsion angles of the drive shaft regardless of the rotational sense of the drive shaft. Since, with the exception of stiffness against torsion, the drive shaft thus does not have to meet any special demands, a machine member that is simple in terms of material and fabrication and which is thus cost-favorable can be employed as the drive shaft.

As already intimated above, it is provided in a development of the invention that the drive shaft is supplied with a driving torque at one side. In a concrete realization, for example, a drive motor connected to the drive shaft at one side can be provided or, on the other hand, the torque can be initiated via a power transmission by means of a toothed belt, whereby a corresponding driving pinion is then also provided on the drive shaft.

The stated object underlying the invention can also be achieved in an especially advantageous fashion in that a harmonic drive gearing is employed as reduction gearing. Harmonic drive gearings are known in and of themselves in the Prior Art, for which reason, for example, only *Gear Handbook*, First Edition, McGraw-Hill Book Company, Inc., 1962, pages 3–35 through 3–44 is referenced. As essential elements, such harmonic drive gearings comprise an internally toothed rigid ring (circular spline), an externally toothed flexible cylinder (flexspline) and an elliptical inside member. Given a harmonic drive gearing wherein the elliptical inside member is connected to the driving side, the flexspine can fundamentally be constrained at the power take-off side and the circular spline can move, just as the circular spline can be constrained and the flexspine can move. Within the context of the present invention, the circular spline is preferably constrained and the output torque is taken at the flexspline. The property of the harmonic drive gearing that a torsionally elastic element is available with the flexspline, which is designed as a flexible component part based on the very nature of the gearing, is thus utilized. For additional information regarding harmonic drive gearing reference is made to pages 389 and 390 of Mcgraw Hill Encycolpedia of Science and Technology Copyright 1960, 1966, 1971 and McGraw Hill which is hereby incorporated by reference.

The bracing of the reduction gears can be implemented in a simple fashion in that the drive wheels or, respectively, the elliptical inside members are twisted on the drive shaft relative to one another. Special masures for biasing the gears against one another are thus not required.

BRIEF DESCRIPTION OF THE DRAWINGS

The invention shall also be set forth in greater detail below with reference to a drawing showing only an exemplary embodiment, wherein are shown FIG. 1 a schematic illustration of a rotary drive of the invention.

Figure 1:
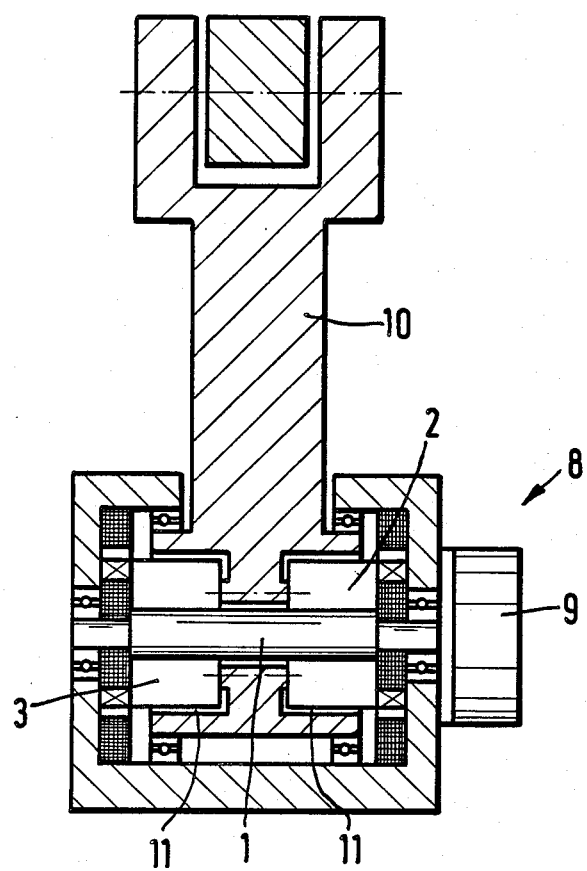

What is shown and described is a mechanical rotary drive referenced 8 overall with which, in the illustrated exemplary embodient, a manipulator arm 10 is rotationally moved via the reduction gears 2 and 3 by means of a torque exerted via a drive motor 9.

At the driving side, i.e. via the drive shaft 1, the reduction gears 2, 3 are connected to one another stiff against torsion and, at the power take-off side, they are connected to one another torsionally elastic via the hollow shafts 11, so that the advantages explained in greater detail above derive in the biasing codition.

In the context of the present invention, the drive shaft 1 is a simple mass-produced part which is distinguished only by a high stiffness against torsion.

Figure 2:
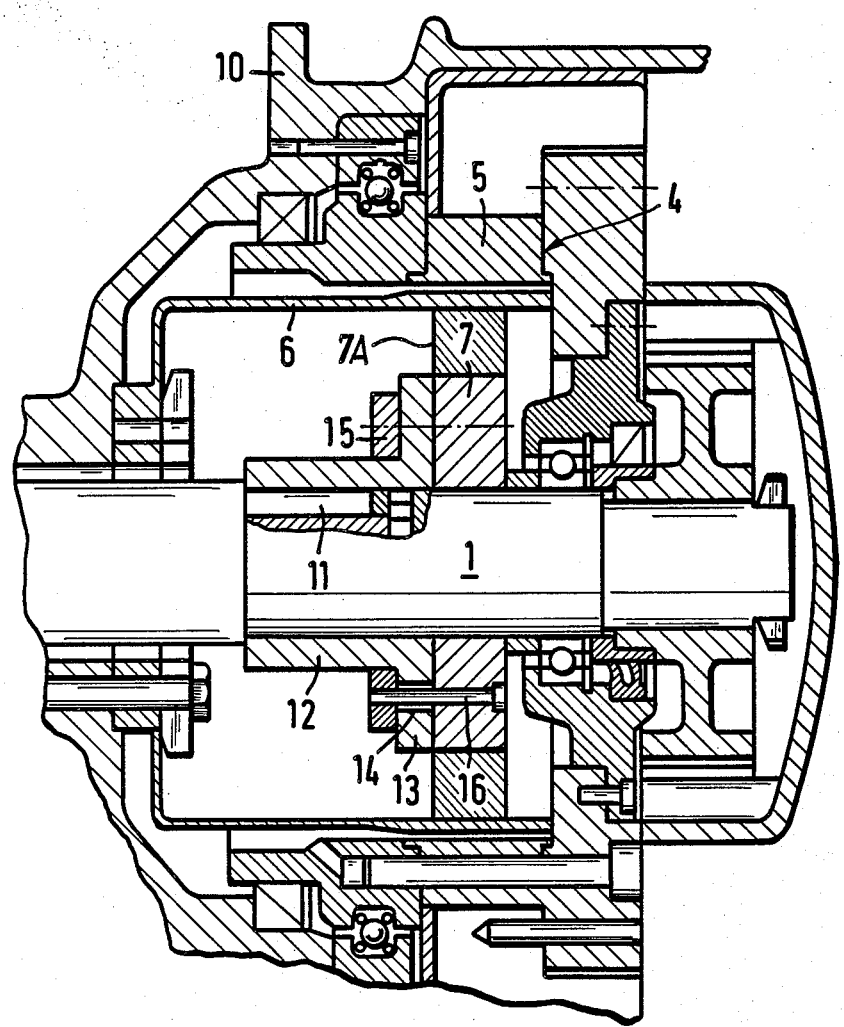
FIG. 2 a partial elevation of a rotary drive of the invention shown in greater structural detail.

As may be seen in greater detail in FIG. 2, the reduction gears 2 and, respectively, 3 in the exemplary embodiment are fashioned as harmonic drive gearings 4 which comprise an internally toothed ring or circular spline 5, an externally toothed, flexible cylinder or flexspline 6 and an elliptical inside member 7 as essential elements. The flexspline 6 is utilized for the transission of the torque at the power take-off side, whereby the described, torsionally elastic coupling between the manipulator arm 10 and the harmonic drive gearing 4 derives.

The elliptical inside member 7 can be turned on the drive shaft 1 and can be locked in any desired position against a fixing sleeve 12 provided on the drive shaft 1 in stationary fashion via a key 11, the afore mentioned biasing of the reduction gears 2, 3 against one another being implementable in a simple fashion therewith.

It is provided in a particularly preferred fashion that a hub 13 of the fixing sleeve 12 having, for example, two circular arc-shaped oblong holes 14 is provided and a clamp disc 15 is additionally provided, the fixing sleeve 12 or, respectively, the hub 13 of the fixing sleeve 12 being capable of being held frictionally engaged with respect to the elliptical inside member 7 with the assistance of this clamp disc 15 aided, for instance, by a lock screw 16.

The darker shaded grid areas in FIG. 1 illustrate meshing areas of harmonic drive gears. Such harmonic drive gears are known to those skilled in the art and details of such harmonic drive gears is not believed necessary in the present specification since structure is well known to those skilled in the art. The elliptical inside member 7 is operationally or drivingly connected to the circular spline (5) in a manner well known in the art as shown by, for example, U.S. Pat. Nos. 3,214,999 or 3,555,929. The driving connection is achieved through a connecting means (7A) schematically illustrated in FIG. 2.

The features of the invention disclosed in the above description, in the drawing and in the claim can, either individually or in arbitrary combinations, be of significance for the realization of the invention in the various embodiments thereof.

I claim:

1. A mechanical rotary drive, preferably a gear reduction drive, particularly for industrial robots, for example a manipulator arm rotary drive comprising a driving side and a power take-off side, a drive shaft, and at least two gears, preferably reduction gears, situated on the drive shaft and biased against one another, characterized in that the gear biasing at the driving side results due to a torsionally stiff coupling and the gear biasing at the power take-off side is executed via a torsionally elastic coupling, characterized in that the drive shaft (1) is supplied with a driving at one side, characterized in that a harmonic drive gearing (4) is employed as reduction gear (2, 3) said harmonic drive gearing comprising an internally toothed, rigid ring (circullar spline) (5), an externally toothed, flexible cylinder (flespline) (6), and an elliptical inside member (7) is drivably connected to spline (5); and in that the flexspline (6) serves as the torsionally elastic coupling at the power take-off side, characterized in that the biasing of the gears (2, 3) is to be executed by turning the elliptical inside member (7) on the drive shaft (1), and characterized in that a clamp disc (15) is provided and a hub (13) of a fixing sleeve (12) having at least one circular arc-shaped oblong hole (14) is provided; and in that the biasing of the gears (2, 3) is to be executed by means of frictionally engaged locking of the hub (13) by means of a lock screw (16) or the like.

* * * * *